United States Patent [19]

Mogamiya et al.

[11] Patent Number: 5,012,262
[45] Date of Patent: Apr. 30, 1991

[54] STROBE DRIVING DEVICE FOR USE IN CAMERA HAVING ZOON LENS

[75] Inventors: Makoto Mogamiya; Tahei Morisawa, both of Tokyo, Japan

[73] Assignee: Asahi Kogala Kogyo Kabushiki Kaisha, Tokyo, Japan

[21] Appl. No.: 413,108

[22] Filed: Sep. 27, 1989

[30] Foreign Application Priority Data

Sep. 29, 1988 [JP] Japan .................................. 63-245594

[51] Int. Cl.5 ............................................. G03B 15/03
[52] U.S. Cl. ............................. 354/149.1; 354/149.11
[58] Field of Search ............. 354/149.1, 149.11, 145.1, 354/421

[56] References Cited

U.S. PATENT DOCUMENTS

| 4,100,554 | 7/1978 | Iijima | 354/149.11 |
| 4,462,666 | 7/1984 | Orban | 354/126 |
| 4,589,023 | 5/1986 | Suzuki et al. | 358/213 |
| 4,609,269 | 9/1986 | Kamata | 354/149.1 |

FOREIGN PATENT DOCUMENTS

| 60-83921 | 5/1985 | Japan | 354/149.1 |
| 173328 | 3/1989 | Japan | 354/149.1 |
| 8707038 | 11/1987 | PCT Int'l Appl. | |

Primary Examiner—L. T. Hix
Assistant Examiner—Jae N. Noh
Attorney, Agent, or Firm—Sandler, Greenblum & Bernstein

[57] ABSTRACT

A strobe driving device having an interlocking lever provided below a zoom photographing lens and a zoom strobe device which are horizontally disposed side by side with their respective optical axes parallel to each other. The interlocking lever has a pivot point halfway between the zoom photographing lens and the zoom strobe device so as to cause the zoom photographing lens and the zoom strobe device to move in association with each other.

10 Claims, 6 Drawing Sheets

STROBE DRIVING DEVICE FOR USE IN CAMERA HAVING ZOON LENS

BACKGROUND OF THE INVENTION

1. Field of the Invention

The present invention relates to a strobe driving device for use in a camera having a zoom lens to change the illumination angle in association with the zooming operation.

2. Description of Related Art

A device that is used in a camera having a zoom lens to change the illumination angle of the strobe device in accordance with the focal length of the zoom lens has already been known, and various kinds of such a device having different structures have been put to practical use.

It is known that the photographing lens and the strobe device are preferably spaced apart from each other as much as possible in order to prevent occurrence of the so called red eye phenomenon (or pink eye effect). The red-eye phenomenon is such that the strobe light enters the eyeball of a subject person through the pupil to illuminate the retina, resulting in a picture in which the subject's eye looks red. In theory, no red-eye phenomenon will occur if the strobe light is satisfactorily spaced from the photographing lens. In a camera wherein the illumination angle of the strobe device is varied in accordance with the focal length of the zoom lens, the zoom lens and the strobe device must be spaced from each other as much as possible and the strobe illumination angle varying member must be moved in accordance with the movement of the zoom lens. In any of the conventional devices, however, the movable member of the variable illumination angle strobe device is moved in accordance with the focal length of the photographing lens by use of a cam plate and a gear train; therefore, the prior art has the problem that as the distance between the photographing lens and the strobe device increases, the overall size increases, and/or the number of required parts increases.

SUMMARY OF THE INVENTION

In view of the above-described problems of the prior art, it is a primary object of the present invention to provide a strobe driving device which is designed so that the photographing lens and the strobe device can be satisfactorily spaced apart from each other without an increase in the overall size of the apparatus or an increase in the number of required parts.

The present invention is based on the idea that a cam ring which effects zooming of the photographing lens and a movable strobe member which changes the illumination angle of the variable illumination angle strobe device are actuated in association with each other through a pivoting lever. If a pivoting lever having a length which corresponds to the distance between the photographing lens and the strobe device is used, it is possible to arrange an interlocking, mechanism without any increase in the number of required parts.

Namely, the present invention provides a strobe driving device for use in a camera having a zoom photographing lens wherein a cam ring is disposed around the optical axis of the zoom photographing lens to effect zooming through rotation; a strobe moving cam groove is formed directly in the cam ring; a guide pin which is fitted in the strobe moving cam groove is provided on a relay block which is guided so as to be movable in the direction parallel to the optical axis of the zoom photographing lens; and the relay block and the movable strobe member of the variable illumination angle strobe device are interlocked with each other through an interlocking lever having a pivot point at the intermediate portion thereof.

The relay block may be omitted. More specifically, it is possible to obtain a strobe driving device for use in a camera having a zoom lens which has no relay block by fitting a guide pin provided on one end of the interlocking lever directly in the strobe moving cam groove formed in the cam ring and linking the other end of the interlocking lever to the movable strobe member of the variable illumination angle strobe device.

According to another aspect of the present invention, there is provided a strobe driving device for a zoom lens camera which comprises: a zoom photographing lens: a zoom strobe device disposed such that the optical axis thereof is parallel to that of the zoom photographing lens, the zoom strobe device having a movable member; a cam member for driving the zoom photographing lens; and an interlocking lever which transmits the movement of the cam member to the movable member of the zoom strobe device, the lever having a pivot point halfway between the zoom photographing lens and the zoom strobe device.

The cam member does not always need to be annular.

The interlocking lever is preferably disposed below the zoom photographing lens and the zoom strobe device.

Referring to of the interlocking lever, the present invention is characterized by an interlocking lever which is provided below a zoom photographing lens and a zoom strobe device which are horizontally disposed side by side with the respective optical axes being parallel to each other. The interlocking lever has a pivot point halfway between the zoom photographing lens and the zoom strobe device so as to cause the zoom photographing lens and the zoom strobe device to move in association with each other.

BRIEF DESCRIPTION OF THE DRAWINGS

FIGS. 1 to 5 show in combination a first embodiment of the present invention, in which:

FIG. 1 is a perspective view illustrating main components of the embodiment with the zoom finder device removed;

FIG. 2 is a perspective view illustrating the general arrangement of the embodiment:

FIG. 3 is an exploded perspective view of an essential part of the embodiment;

FIG. 4 is a front view of the embodiment; and

FIG. 5 is a plan view of the embodiment.

DETAILED DESCRIPTION

Figure 1:
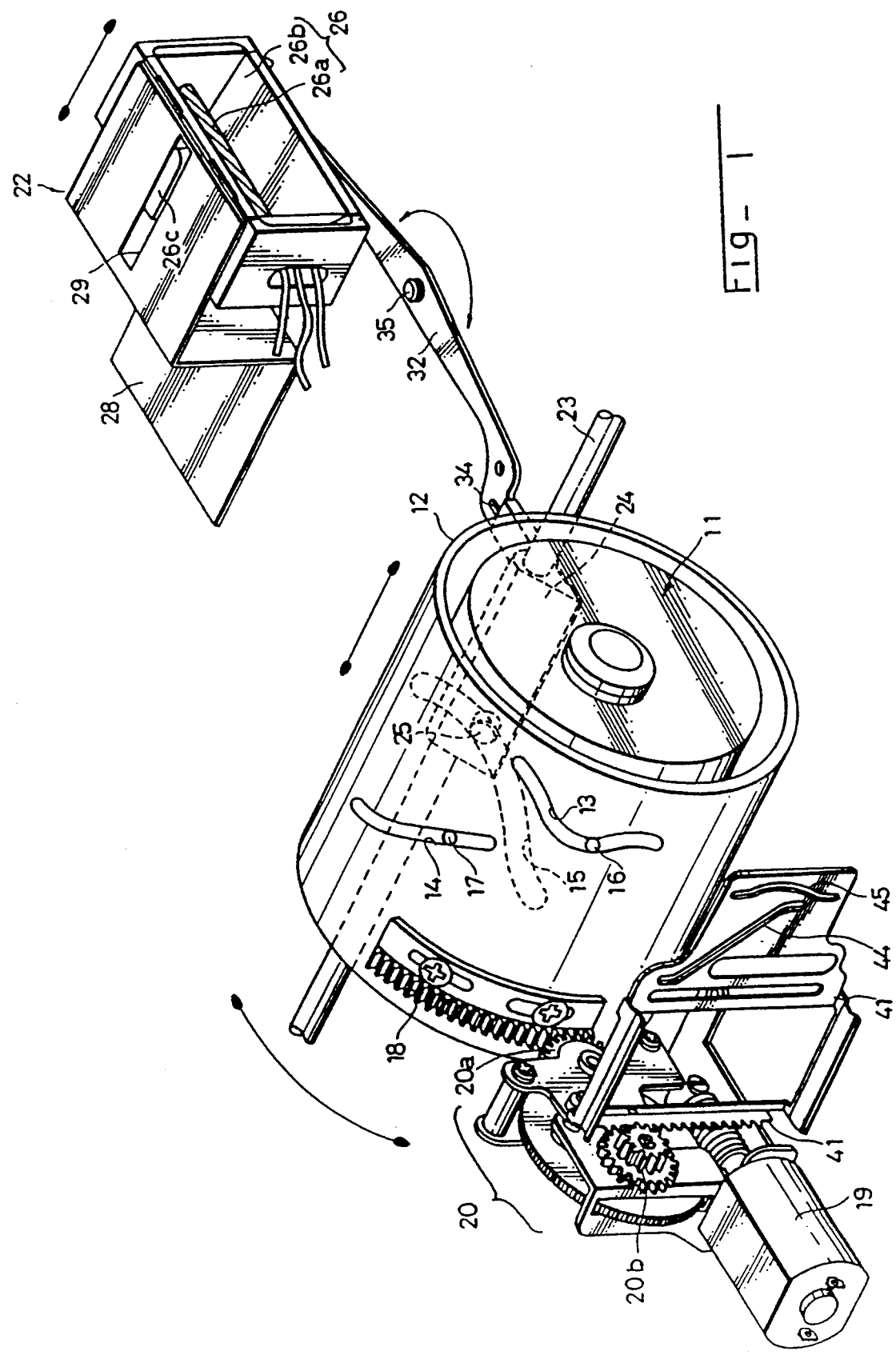

The present invention will be described below in detail by way of embodiments and with reference to the accompanying drawings. FIGS. 1 to 5 show, in combination, a first embodiment of the present invention. A zoom photographing lens 11 has a cam ring 12 on the outer periphery thereof. The cam ring 12 is formed with zooming cam grooves 13 and 14 for movable lenses and a cam groove 15 for moving the strobe device. In the zooming cam grooves 13 and 14 are fitted guide pins 10 and 17 which are integrally provided on front and rear lens groups (not shown), respectively.

The cam ring 12 has a sector gear 18 secured to the outer periphery thereof. The sector gear 18 is in mesh with a terminal gear 20a (see FIGS. 1 and 3 of a gear train 20 which is driven forward and backward by means of a reversible motor 19. Accordingly, as the cam ring 12 rotates forward or backward through the motor 10, the front and rear lens groups move along the optical axis in accordance with the respective cam profiles of the zooming cam grooves 13 and 14 while changing the air distance (air gap) there-between, thus effecting zooming.

A guide bar 23 which extends parallel to the optical axis of the zoom photographing lens 11 is fixed below that side of the lens 11 which is closer to a variable illumination angle strobe device 22. A relay block 24 is movably supported on the guide bar 23. The relay block 24 has a guide pin 25 which is fitted in the strobe moving cam groove 15, so that as the cam ring 12 rotates the relay block 24 moves along the optical axis in accordance with the cam profile of the cam groove 15.

The variable illumination angle strobe device 22 is provided at one side of the zoom photographing lens 11. The device 22 has a xenon lamp (light emitting tube) 26a and a reflecting shade 26b which constitute, in combination, a movable block (strobe moving member) 26. The movable block 26 is moved relative to a fixed condenser lens (Fresnel lens) 27 (see FIG. 2), thereby changing the illumination angle. The movable block 26 has a guide projection 26c provided on the upper side thereof, the projection 26c being elongated in the direction parallel to the optical axis. The guide projection 26c is fitted in a guide bore 29 formed in a guide rail plate 28, the guide bore 29 extending in the direction parallel to the optical axis. To change the illumination angle, it is only necessary to move either the combination of the xenon lamp 26a and the reflecting shade 26b or the condenser lens 27 along the optical axis. Either or both of these two members may be defined as strobe moving members.

An interlocking pin 30 is provided on the lower side of the movable block 26, and another interlocking pin 31 is provided on the relay block 24. The interlocking pins 30 and 31 are fitted in respective interlocking grooves 33 and 34 which are formed in two end portions, respectively, of an interlocking lever 32 which is pivotally attached at the intermediate portion thereof to a stationary portion through a fixed shaft 35. Accordingly, the movement of the relay block 24 is transmitted to the movable block 26. The profile of the strobe moving cam groove 15 and the lengths of the arms of the interlocking lever 32 are determined so that the illumination angle of the strobe device that is determined by the position of the movable block 26 of the variable illumination angle strobe device 22 corresponds to the change in the focal length of the zoom photographing lens 11 caused by the rotation of the cam ring 12.

Figure 2:
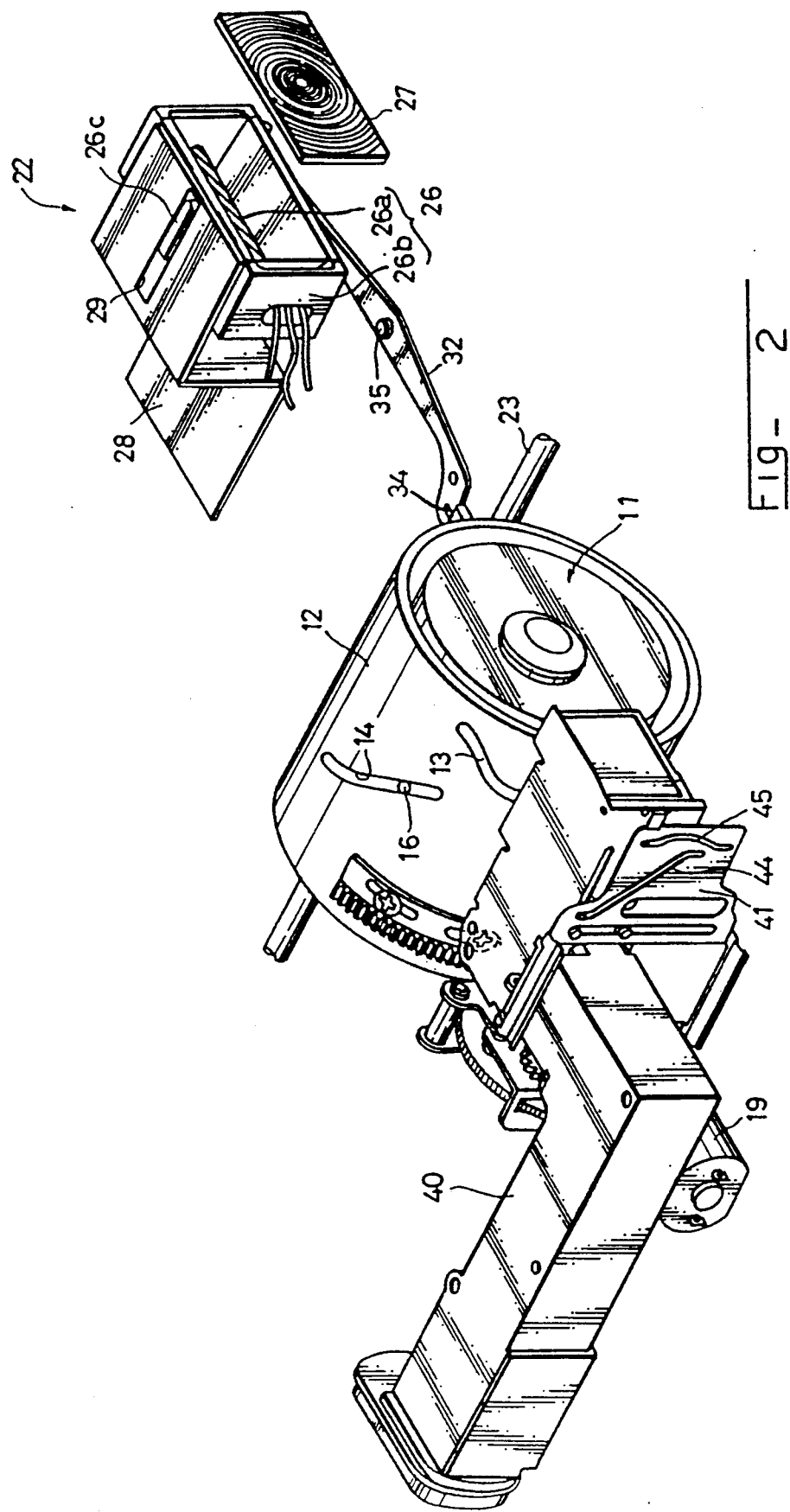
Figure 3:
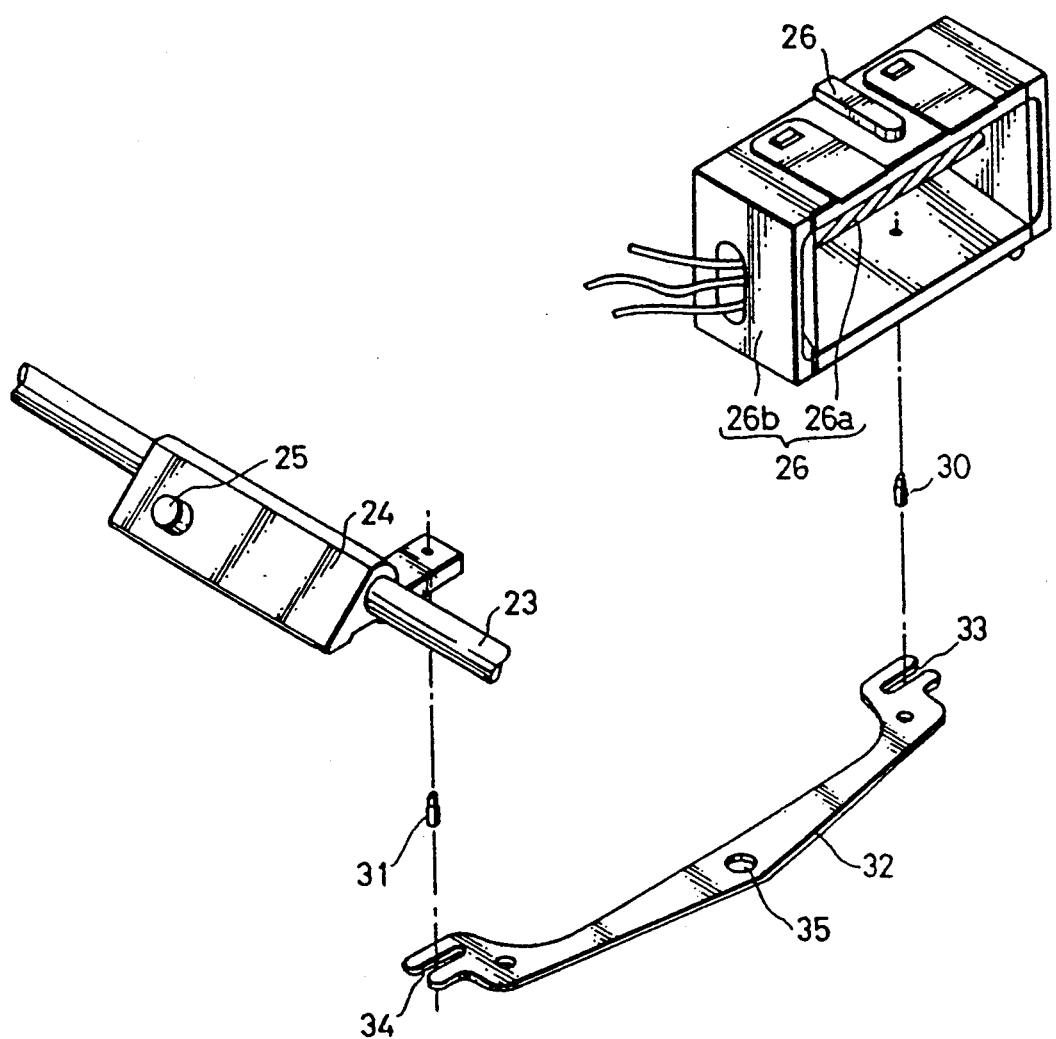
Figure 4:
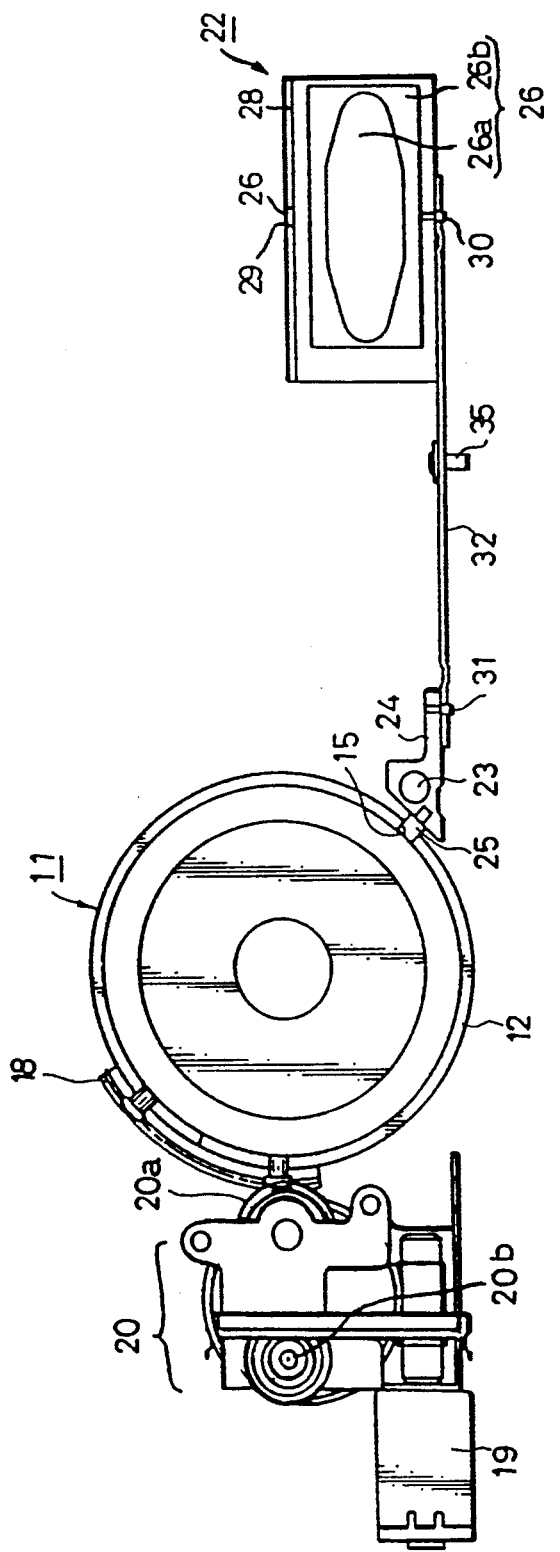
Figure 5:
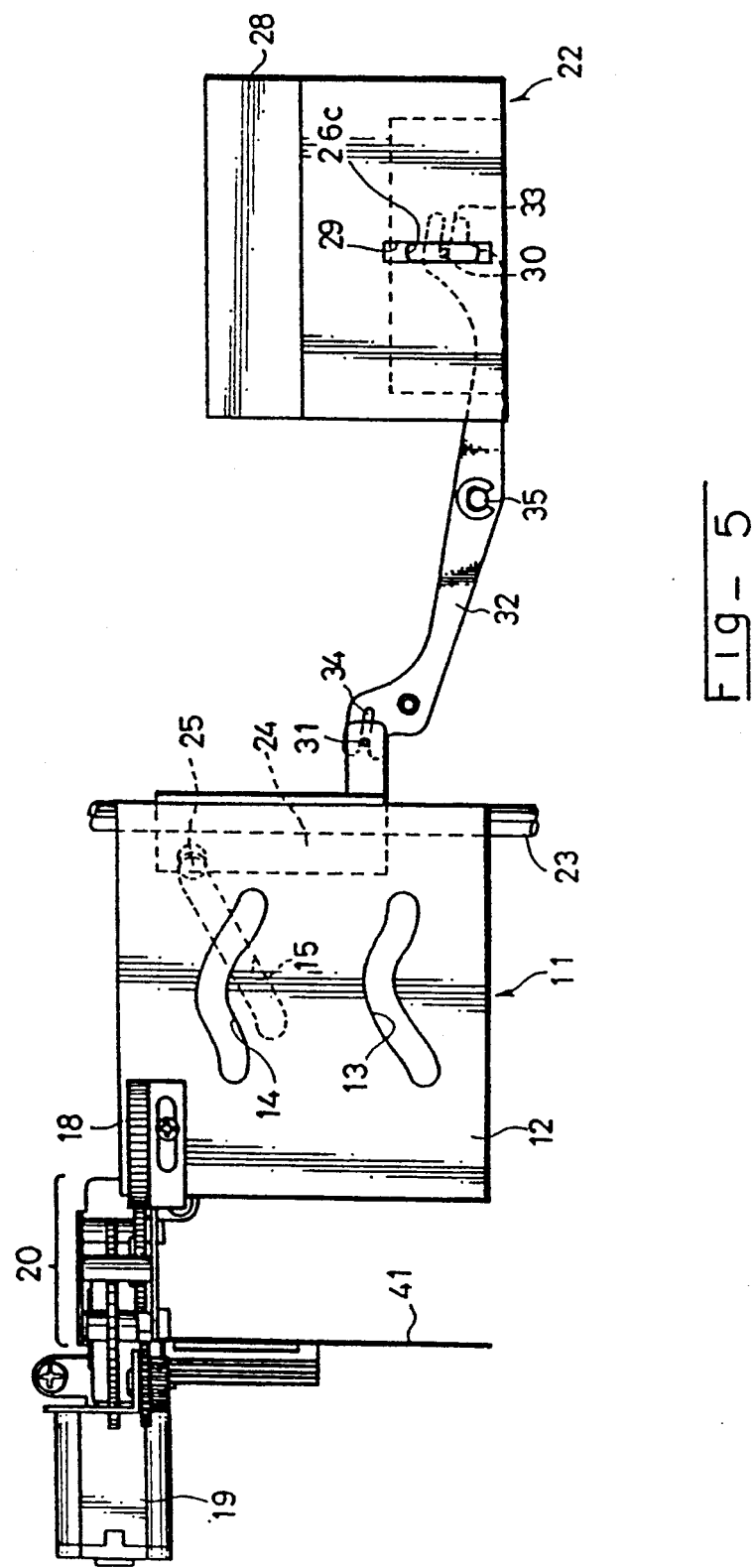

The gear train 20 that is driven by the reversible motor 19 also drives a zoom finder device 40 (see FIG. 2). More specifically, another terminal gear 20b (see FIGS. 1 and 4) of the gear train 20 is in mesh with a vertical rack 42 formed on a finder cam plate 41, so that the finder cam plate 41 moves vertically in response to the rotation of the reversible motor 19. The finder cam plate 41 has cam grooves 44 and 45 which are respectively fitted with interlocking pins for movable lens provided inside the zoom finder device 40, so that in response to the vertical movement of the finder cam plate 41, the finder field of view changes in correspondence with the focal length of the zoom photographing lens 11.

Therefore, in the strobe driving device having the foregoing arrangement, as the cam ring 12 is driven forward or backward by means of the reversible motor 10, the focal length of the zoom photographing lens 11 varies by the action of the zooming cam grooves 12 and 14 and, at the same time, the relay block 24 moves along the optical axis by the action of the strobe moving cam groove 15. The movement of the relay block 24 along the optical axis is converted through the interlocking lever 32 into a movement of the movable block 20 along the optical axis. As a result, the strobe illumination angle of the variable illumination angle strobe device 22 changes. As has been described above, the cam profile of the strobe moving cam groove 15 and the lengths of the arms of the lever are determined so that the strobe illumination angle is varied in association with the change in the focal length of the zoom photographing lens 11. That is, on the long focal length side, the illumination angle is narrowed, whereas, on the short focal length side, the illumination angle is widened. Thus, it is possible to obtain a strobe illumination angle corresponding to the focal length of the photographing lens.

Figure 6:
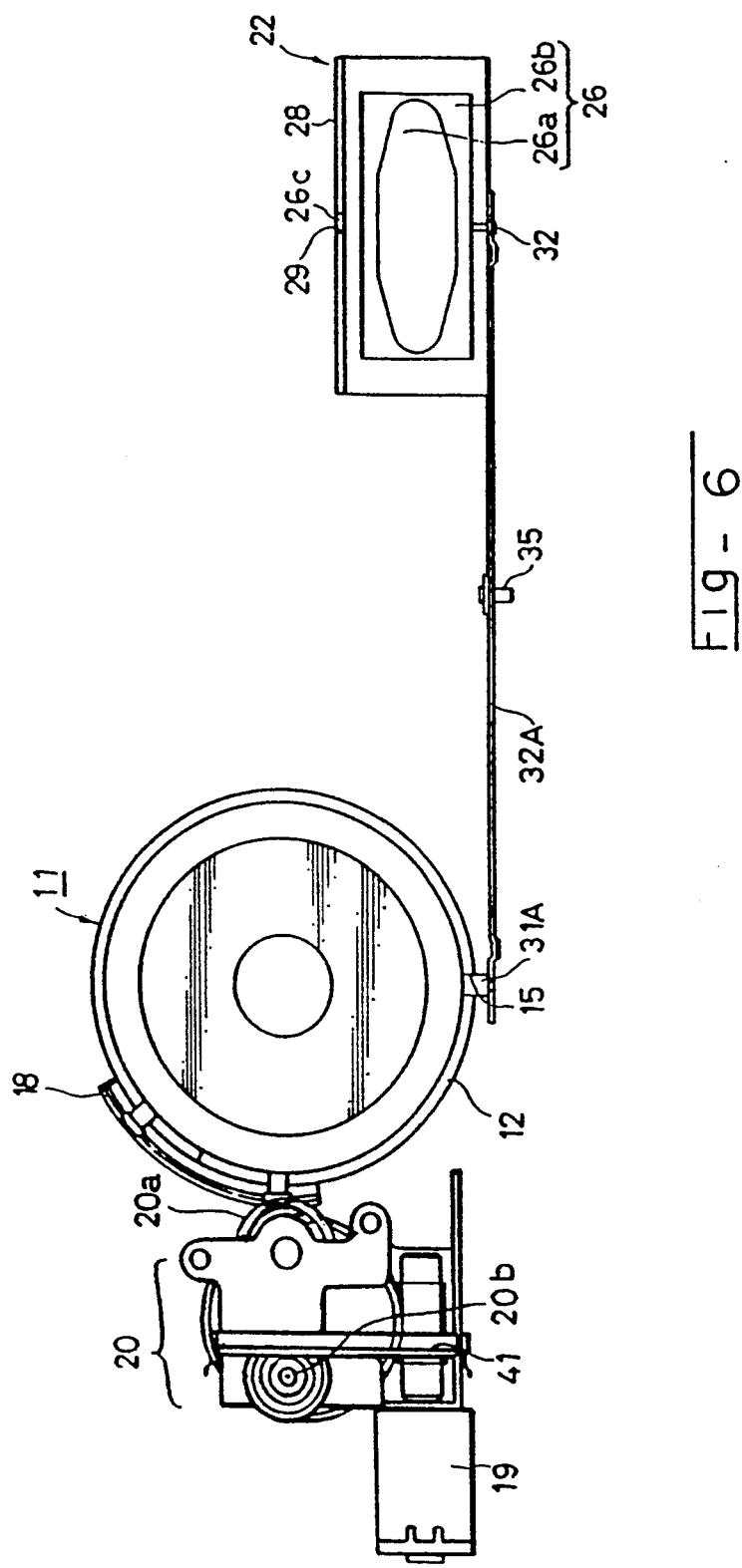
FIG. 6 is a front view illustrating another embodiment of the present invention.

FIG. 6 shows another embodiment of the present invention. In this embodiment, the need for the relay block 24 of the first embodiment is eliminated. The end portion of the interlocking lever 32A which is closer to the zoom photographing lens 11 is extended to a position below (directly below) the cam ring 12, and an interlocking pin 31A which is provided at the end of the extended portion is fitted directly in the strobe moving cam groove 15 provided in the cam ring 12. This embodiment enables a further reduction in the number of required parts and simplification of the structure.

In either of the foregoing embodiments, it is possible to increase the distance between the zoom photographing lens 11 and the variable illumination angle strobe device 22 to prevent occurrence of the red eye phenomenon simply by correspondingly increasing the length of the interlocking lever 32 without an increase in the overall size of the apparatus or an increase in the number of required parts.

As has been described above, the strobe driving device for use in a camera having a zoom lens according to the present invention is arranged such that a strobe moving cam groove is provided directly in a cam ring designed to vary the focal length of the zoom photographing lens and a relay block which moves along the optical axis in accordance with the profile of the cam groove and a movable strobe member designed to vary the illumination angle of the strobe device are coupled together through an interlocking lever. It is therefore possible to increase the distance between the zoom photographing lens and the strobe device without increasing the overall size of the apparatus or increasing the number of required parts. If an interlocking pin which is provided on one end of the interlocking lever is fitted directly in the strobe moving cam groove formed in the cam ring, it is possible to achieve a further reduction in the number of required parts. Since the number of movable members that constitute the interlocking mechanism is only one, i.e., the interlocking lever, or two, i.e., the interlocking lever and the relay block, it is possible to save space. In addition since the strobe moving cam groove is formed directly in the cam ring for the zoom photographing lens, the adjustment of the assembly becomes unnecessary or easy.

We claim:

1. A strobe driving device for use in a zoom lens camera including a zoom photographing lens having an optical axis and a variable illumination angle strobe device having a movable strobe member which is moved so as to change the illumination angle in accordance with the focal length of the zoom photographing lens, the strobe driving device comprises:
    a cam ring disposed around the optical axis of the zoom photographing lens to effect zooming through rotation;
    a cam groove in said cam ring for moving said strobe device;
    a relay block guided so as to be movable in a direction parallel to the optical axis of said room photographing lens, said relay block having a guide pin fitted in said strobe moving cam groove;
    an interlocking lever which causes said relay block and said movable strobe member of said variable illumination angle strobe device to move in association with each other, said interlocking lever having a pivot point at an intermediate portion thereof.

2. A strobe driving device according to claim 1, wherein said movable strobe member is a stroke moving block having a light emitting tube and a reflecting shade which are combined together in one unit.

3. A strobe driving device for use in a zoom lens camera including a zoom photographing lens having an optical axis and a variable illumination angle strobe device having a movable strobe member which is moved so as to change the illumination angle in accordance with the focal length of the room photographing lens, said strobe driving device comprising:
    a cam ring disposed around the optical axis of the zoom, photographing lens to effect zooming through rotation;
    a cam groove formed in said cam ring for moving said strobe device; and
    an interlocking lever having at one end thereof a guide pin fitted in said strobe moving cam groove, the other end of said lever linked to said movable strobe member, said interlocking lever having a pivot point at an intermediate portion thereof.

4. A strobe driving device according to claim 3, wherein said movable strobe member is a strobe moving block having a light emitting tube and a reflecting shade which are combined together in one unit.

5. A strobe driving device according to claim 3, wherein the guide pin of said interlocking lever that is fitted in said strobe moving cam groove in said cam ring is located directly below said cam ring.

6. A strobe driving device comprising:
    a zoom photographing lens;
    a zoom strobe device disposed side by side with said zoom photographing lens with their respective optical axes being parallel to each other, said zoom strobe device having a movable member;
    a cam member for driving said zoom photographing lens; and
    an interlocking lever which transmits the movement of said cam member to the movable member of said zoom strobe device, said lever having a pivot point halfway between said zoom photographing lens and said zoom strobe device.

7. A strobe driving device according to claim 6, wherein said interlocking lever is located below said zoom photographing lens and said zoom strobe device.

8. A strobe driving device according to claim 6, wherein said cam member is disposed on the outer periphery of said zoom photographing lens.

9. A strobe according to claim 8, wherein said cam member has a strobe moving cam groove which is fitted with a guide pin provided on a relay block guided so as to be movable along the optical axis, said relay block coupled to one end of said interlocking lever, and the other end of said interlocking lever coupled to the movable member of said zoom strobe device.

10. A strobe driving device according to claim 8, wherein said cam member has a strobe moving cam groove which is fitted with a guide pin provided on one end of said interlocking lever, and the other end of said interlocking lever being coupled to the movable member of said zoom strobe device.

* * * * *

UNITED STATES PATENT AND TRADEMARK OFFICE
CERTIFICATE OF CORRECTION

PATENT NO. : 5,012,262
DATED : April 30, 1991
INVENTOR(S) : T. M. MOGAMIYA et al.

It is certified that error appears in the above-indentified patent and that said Letters Patent is hereby corrected as shown below:

```
On the cover page, line 54, change "ZOON" to ---ZOOM---.
At column 1, line 3, change "ZOON" to ---ZOOM---.
At column 1, line 21, change "so called" to ---so-called---.
At column 1, line 21, change "pink eye" to ---pink-eye---.
At column 1, line 59, delete "." after "interlocking".
At column 2, line 17, change "lens:" to ---lens:---.
At column 2, line 32, delete "of" after "to".
At column 3, line 5, insert ")" after "3".
At column 3, line 12, change "there-between" to ---therebetween---
At column 3, line 29, change "2)." to ---2).---.
At column 4, line 41, change "red eye" to ---red-eye---.
At column 4, line 67, insert "." after "addition".
At column 5, line 17 (claim 1, line 14), change "room" to ---zoom---
```

Signed and Sealed this

Thirty-first Day of October 1995

Attest:

BRUCE LEHMAN

Attesting Officer

Commissioner of Patents and Trademarks